Patented June 24, 1941

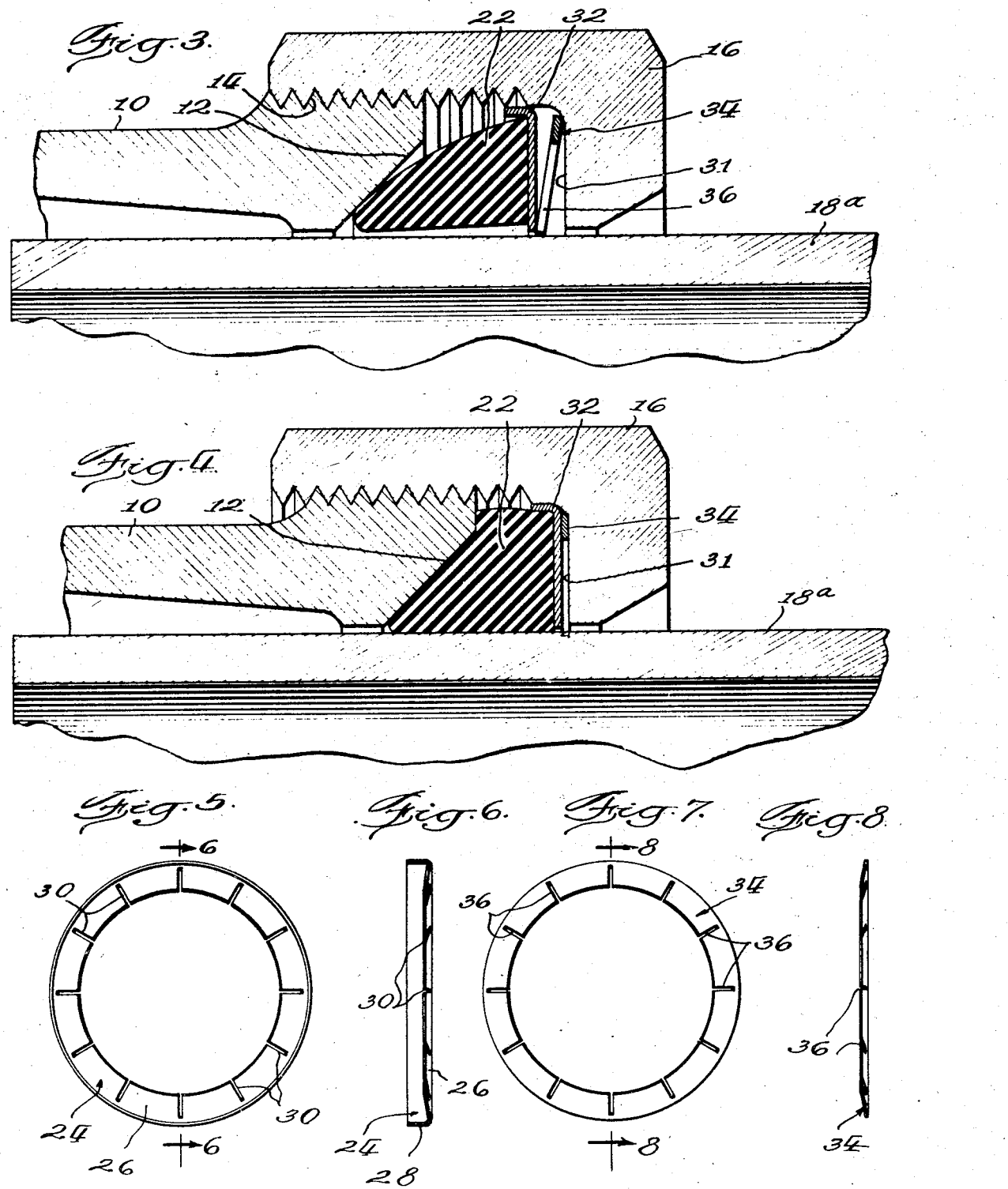

2,247,032

UNITED STATES PATENT OFFICE 2,247,032

PIPE JOINT

Charles E. Norton, Evanston, Ill., assignor to Norton-McMurray Manufacturing Company, Chicago, Ill., a corporation of Illinois Application November 8, 1940, Serial No. 364,767

1 Claim. (Cl. 285—166)

My invention relates to pipe joints and is more particularly concerned with a pipe joint of the compression coupling type wherein a rubber or similar gasket is utilized to seal the joint between the two sections of pipe.

In pipe joints of this kind, locking rings have simetimes been provided to form a mechanical interlock between the two sections of pipe in addition to the gripping action provided by the rubber gasket. In these pipe joints of the prior art, however, the locking ring has permitted longitudinal movement of one pipe section relative to the other when the gripping action of the rubber gasket was weakened as a result of decay, heat, chemical, or other actions.

An object of my invention is to provide a pipe joint wherein the mechanical gripping provided by the locking ring is so disposed and arranged that no separating movement of the pipe sections can occur, even though the rubber gasket has deteriorated or has been entirely destroyed.

Another object of my invention is to provide a pipe joint wherein the retainer for the rubber or similar gasket is made in the form of a locking ring.

Other objects of my invention will become apparent as the description proceeds.

In the drawings, Figure 1 is a longitudinal sectional view of a pipe coupling embodying a preferred form of my invention. In this view, the parts are shown in assembled position, but before the coupling has been tightened.

Fig. 3 is a partial view similar to Fig. 1, but showing a modified form of my invention.

Fig. 4 shows the modified form of Fig. 3 in final or tightened position.

Fig. 5 is a front view of my novel gasket retainer and locking ring.

Fig. 6 is a sectional view taken on the line 6—6 of Fig. 5.

Fig. 7 is a front view of the locking ring of the embodiment of Figs. 3 and 4, and Fig. 8 is a sectional view taken on the line 8—8 of Fig. 7.

Figure 1:
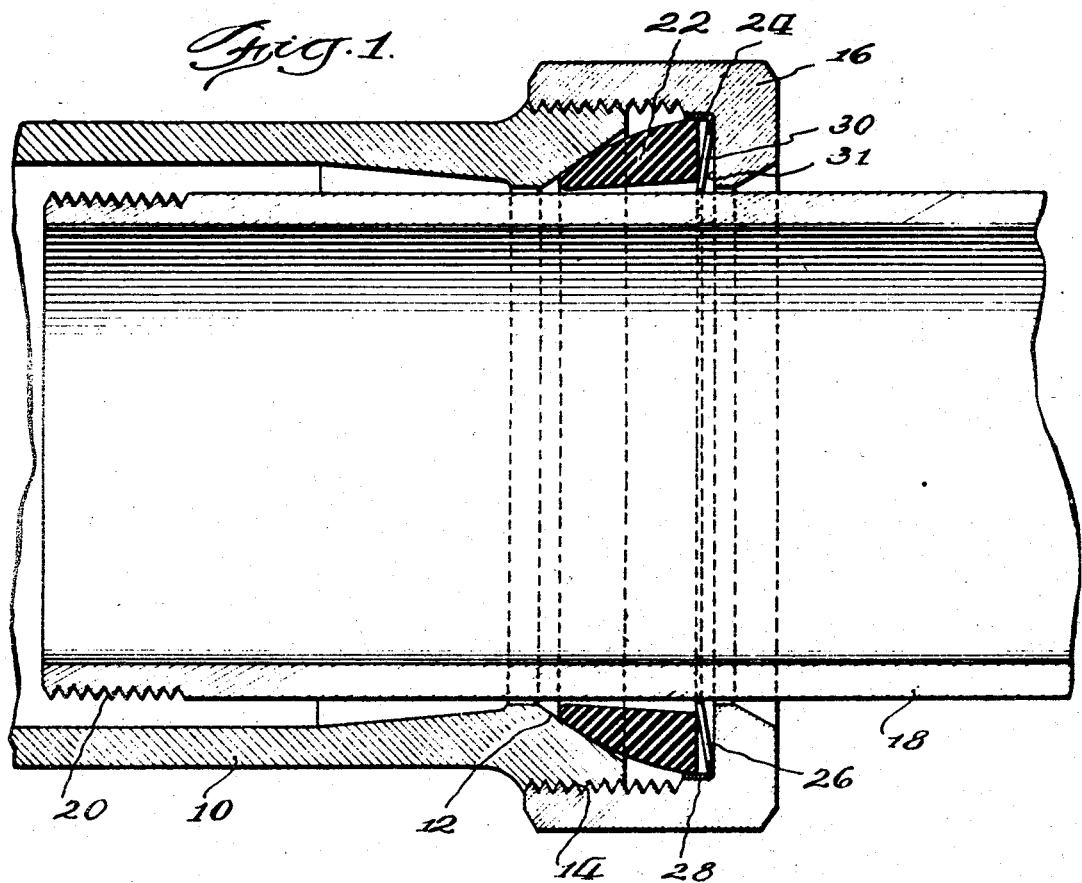
Figure 2:
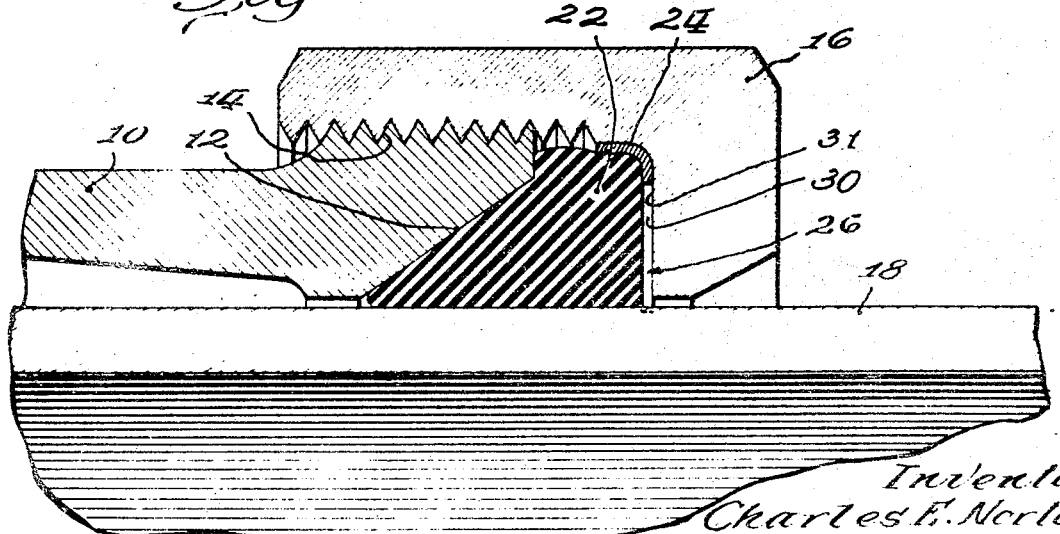
Fig. 2 is a partial view similar to Fig. 1, but showing the coupling in tightened or final position.

Referring to Figures 1 and 2, I have shown a first pipe section 10 having a flaring inner end surface 12, surrounded by external threads 14. A tubular nut 16 engages the threads 14 on the pipe section 10. A second pipe section 18 has one end inserted in the adjacent end of the pipe section 10. The telescoped end of the pipe section 18 may have a plain external surface, or this external surface may be provided with threads, as indicated at 20, provided these threads are not so located as to be engaged by the gasket 22 of rubber or other suitable material.

The gasket 22 preferably has an inner surface which is slightly conical to facilitate slippage of the gasket 22 relative to the end of the pipe 18. The external surface of the annular gasket 22 is preferably made in the form of a sphere, as clearly indicated in Figure 1. The gasket 22 is provided with a combined retaining and locking ring 24.

The combined locking and retaining ring 24 is best shown in Figures 5 and 6 of the drawings and comprises a conical base 26 and a cylindrical flange 28. The conical base 26 is provided with a plurality of radially arranged slots 30, as most clearly shown in Figure 5 of the drawings.

When the pipe coupling is first assembled, the parts are in the position shown in Figure 1 and in this position of the parts the pipe section 18 may be freely moved longitudinally of the pipe section 10 and the coupling parts assembled therewith. The design of the gasket 22 is such that a slight tightening of the tubular nut 16 will create an initial seal between the pipe sections 10 and 18. This initial seal can ordinarily be created by turning the nut 16 by hand and is usually sufficient for testing purposes; and thereafter the initial seal may be released by manually unscrewing the nut 16.

The locking ring 26 performs no particular gripping action in creating this initial seal and functions, primarily, as a retainer for the gasket 22. It will be noted that because of the particular design of the parts, an initial seal suitable for testing purposes may be created by manual operation of the nut 16 and may be similarly released by manual operation. This makes unnecessary the use of tools for testing purposes and greatly increases the speed with which a test installation may be made and subsequently adjusted, if adjustment be necessary, since the initial seal may be created and released innumerable times without damage to the coupling parts.

When it is desired to tighten the coupling to form a permanent joint between the pipe sections 10 and 18, the nut 16 is turned by a wrench, or other suitable means, until the gasket 22 is distorted to the condition indicated in Figure 2, and the base 26 of the combined retainer and locking ring is flattened until it assumes the position shown in Figure 2. In this position, the inner edge of the base portion 26 of the locking ring bites into the exterior surface of the pipe section 18 and forms a strong mechanical grip between the two pipe sections which prevents their separation.

The deformation of the rubber gasket 22 causes this gasket to grip the exterior surface of the pipe section 18 and provides a grip between the two pipe sections by way of the gasket 22. The gripping action of the gasket 22 is in addition to the gripping action of the locking ring 24 and both tend to resist any separation of the two pipe sections.

The gasket 22 of rubber or other suitable material sometimes deteriorates due to age, chemical action, heat, or for other reasons and such deterioration or decay weakens the grip of the gasket 22 on the exterior surface of the pipe section 18. It frequently happens that the deterioration of the gasket 22 has progressed to such a stage that the gripping action of the gasket on the pipe section 18 is practically destroyed, but the gasket 22 is still capable of maintaining a fluid-tight seal between the two pipe sections. Under these conditions, the locking ring 24 is effective to prevent the pipe section 18 from being pulled out of the pipe section 10 so that the joint retains both its gripping and sealing functions and remains serviceable and effective long after the gripping action of the gasket 22 has been destroyed.

Particular attention is called to the fact that any force exerted on the pipe section 18 and tending to withdraw the pipe section from the pipe section 10 simply pulls the base 26 of the retainer and locking ring 24 against the shoulder 31 of the nut 16. This shoulder 31 prevents lengthwise movement of the ring 24 in the direction of the pull and thereby prevents any longitudinal movement of the pipe section 18 away from the pipe section 10. The pipe sections are thus prevented from separating completely or even partially, despite any deterioration or even complete destruction of the gasket 22. This feature of my invention is especially important where the pipe is used to support or hold in position an appliance or other device supplied with fluid through the piping, as in many instances such appliance might be injured or destroyed by any lengthening of the pipe to which it is attached.

In Figures 3 and 4, I have shown a modified form of my invention wherein the retainer ring and the locking ring are made separate. In this embodiment of my invention, the gasket 22 is provided with a retainer ring 32 which has no locking function and a locking ring 34 is interposed between the retainer ring 32 and the shoulder 31 of the tubular nut 16.

Referring to Figures 7 and 8, it will be seen that the retainer locking ring 34 is normally conical and is provided with radial slots 36 to permit flattening of the ring when the coupling is tightened. The locking ring 34 is shown in flattened position in Figure 4.

In Figures 3 and 4, the pipe section 18A is identical with the pipe section 18 of the previous embodiment except that the end of the pipe section 18A which is telescoped in the pipe section 10 is provided with a smooth exterior surface, whereas the corresponding surface of the pipe section 18 is threaded as indicated at 20 in Figure 1. It will be understood that either form of my invention can be used with a male pipe section having either a threaded or smooth exterior surface.

While I have described my invention as being used to connect two pipe sections, it is to be understood that my invention is equally adapted for connecting all kinds of fittings and nipples to sections of pipe or to other fittings and nipples. It is preferable that the gaskets 22 seal against a smooth external surface of the inner pipe section, but this is not essential and where necessary, these gaskets can be used to seal against a threaded external surface like the threaded portion 20 of the pipe section 18 of Figure 1. My invention is not limited to the particular form shown, but may assume numerous other forms within the scope of the appended claims.

What I claim and desire to secure by United States Letters Patent is:

A pipe joint comprising a pipe section providing a recess for receiving a flexible gasket, a flexible gasket in said recess, a nut for urging said gasket into said recess and distorting said gasket against a second pipe section telescoped in said first-mentioned pipe section, and a combined gasket protector and locking ring having a dished body and axially extending flange for protecting the side wall of said gasket from injury through rotation of said nut, said combined gasket protector and locking ring being interposed between said gasket and nut and distorted by movement of said nut firmly to grip said inner pipe section.

CHARLES E. NORTON.